(12) United States Patent
Ina et al.

(10) Patent No.: US 10,928,684 B2
(45) Date of Patent: Feb. 23, 2021

(54) DISPLAY DEVICE

(71) Applicant: SHARP KABUSHIKI KAISHA, Sakai (JP)

(72) Inventors: Keiichi Ina, Sakai (JP); Jin Nakamura, Sakai (JP); Hisashi Nagata, Sakai (JP); Isao Takahashi, Sakai (JP); Yasuyoshi Kaise, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/827,304

(22) Filed: Mar. 23, 2020

(65) Prior Publication Data

US 2020/0310186 A1 Oct. 1, 2020

Related U.S. Application Data

(60) Provisional application No. 62/824,870, filed on Mar. 27, 2019.

(51) Int. Cl.
*G02F 1/1339* (2006.01)
*G02F 1/1333* (2006.01)
*G02F 1/1335* (2006.01)
*G02F 1/1368* (2006.01)

(52) U.S. Cl.
CPC .... *G02F 1/13394* (2013.01); *G02F 1/133345* (2013.01); *G02F 1/133514* (2013.01); *G02F 1/1368* (2013.01); *G02F 2001/13396* (2013.01)

(58) Field of Classification Search
CPC ............. G02F 1/1335; G02F 1/133512; G02F 1/1339; G02F 1/13394; G02F 1/134363; G02F 1/1362; G02F 1/136286; G02F 1/133514; G02F 1/1333; G02F 1/1343; G02F 1/1368; G02F 1/133345; G02F 2201/48; G02F 2001/13396
See application file for complete search history.

(56) References Cited

U.S. PATENT DOCUMENTS 10,108,222 B2 * 10/2018 Gupta ................. G02F 1/13394
2013/0258234 A1   10/2013 Park et al.
2017/0075174 A1 *  3/2017 Lee ................... G02F 1/133512

FOREIGN PATENT DOCUMENTS

JP        2013-205840 A     10/2013

* cited by examiner

*Primary Examiner* — Thoi V Duong
(74) *Attorney, Agent, or Firm* — ScienBiziP, P.C.

(57) ABSTRACT

A display device includes a color filter substrate, an array substrate, a liquid crystal layer, a protection layer, and a plurality of main spacers. The color filter substrate includes a display region, a hole frame region, and a hole region. Further, in a thickness direction of the hole region of the color filter, an organic flattening film is present on a surface of the array substrate on the color filter substrate side at parts corresponding to positions of the main spacers.

5 Claims, 7 Drawing Sheets

DISPLAY DEVICE

TECHNICAL FIELD

The present invention relates to a display device.

BACKGROUND ART

In recent years, as an electronic device including a camera function, such as a smartphone, an electronic device including a camera arranged in a display region in order to secure an area of the display region has been known. In such electronic device, a hole that allows the camera to be mounted in the display region is provided.

For example, JP 2013-205840 A describes a display device provided with a hole in a part of the display region in which a camera is mounted. The display device of JP 2013-205840 A has a structure in which a liquid crystal (LC) layer is sandwiched between a color filter (CF) substrate and an array substrate including a thin film transistor (TFT) formed therein.

In a case where a hole is provided in a display region of such display device, for example, a black matrix (light shielding film) at a position corresponding to the hole in the color filter substrate is removed to form a see-through hole. With this, transmittance of the region having the hole (hole region) is improved (see FIG. 3 in JP 2013-205840 A). Further, JP 2013-205840 A describes a configuration of removing a liquid crystal layer in the hole region and arranging a spacer (see FIG. 14 and the like in JP 2013-205840 A).

SUMMARY OF INVENTION

However, the display device illustrated in FIG. 3 in JP 2013-205840 A, at the position corresponding to the hole, a spacer for uniforming a distance (cell thickness) between the color filter substrate and the array substrate is not arranged. Thus, the cell thickness is unstable, and display unevenness is caused around a hole region, which may arise a problem of degradation of display quality.

Meanwhile, in the display device illustrated in FIG. 14 in JP 2013-205840 A, at the position corresponding to the hole, a space having the same structure of the spacer in the display region is arranged to secure the cell thickness. However, the spacer is arranged at an entire region corresponding to the hole between the color filter substrate and the array substrate, which may arise a problem of reduction in transmittance.

One aspect of the present invention has been made to solve the above-mentioned problems, and has an object to provide a display device capable of stabilizing a thickness between an array substrate and a color filter substrate in a hole region and improving transmittance in the hole region.

(1) According to one embodiment of the present invention, a display device includes: a color filter substrate including a display region, a hole frame region, and a hole region and including a plurality of color filters; an array substrate facing the color filter substrate and including an organic flattening film formed on a surface on a side close to the color filter substrate; a liquid crystal layer sandwiched between the color filter substrate and the array substrate; a protection layer configured to protect the plurality of color filters, the protection layer being arranged between the color filter substrate and the liquid crystal layer; and a plurality of spacers arranged between the protection layer and the array substrate. The organic flattening film is present at parts corresponding to the positions of the plurality of spacers in a thickness direction the hole region of the color filter substrate.

(2) In addition to the configuration in (1) described above, in the display device according to the embodiment of the present invention, the protection layer is present at the parts corresponding to the positions of the plurality of spacers in the thickness direction of the hole region of the color filter substrate.

(3) In addition to the configuration in (1) or (2) described above, in the display device according to the embodiment of the present invention, the plurality of color filters are present at the parts corresponding to the positions of the plurality of spacers in the thickness direction of the hole region of the color filter substrate.

(4) In addition to the configuration in (1), (2), or (3) described above, in the display device according to the embodiment of the present invention, one of the plurality of color filters that transmits white light is provided in the hole region of the color filter substrate.

(5) In addition to the configuration in any one of (1) to (4) described above, in the display device according to the embodiment of the present invention, in the hole region of the color filter substrate, the plurality of spacers are arranged at a density substantially the same a density in the display region and the hole frame region.

According to one aspect of the present invention, transmittance in the hole region can be improved while stabilizing the thickness between the array substrate and the color filter substrate in the hole region.

DESCRIPTION OF EMBODIMENTS

First Embodiment

With reference to FIG. 1 to FIG. 5, a first embodiment of the present invention is described below.

Schematic Configuration of Display Device

Figure 1:
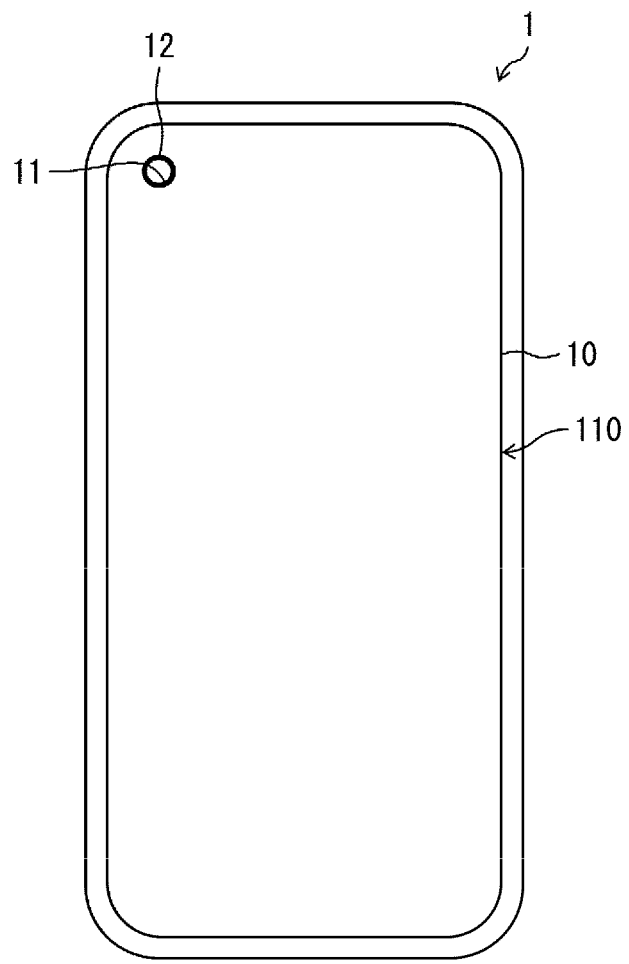
FIG. 1 is a schematic view illustrating a display device according to a first embodiment of the present invention.
Figure 4:
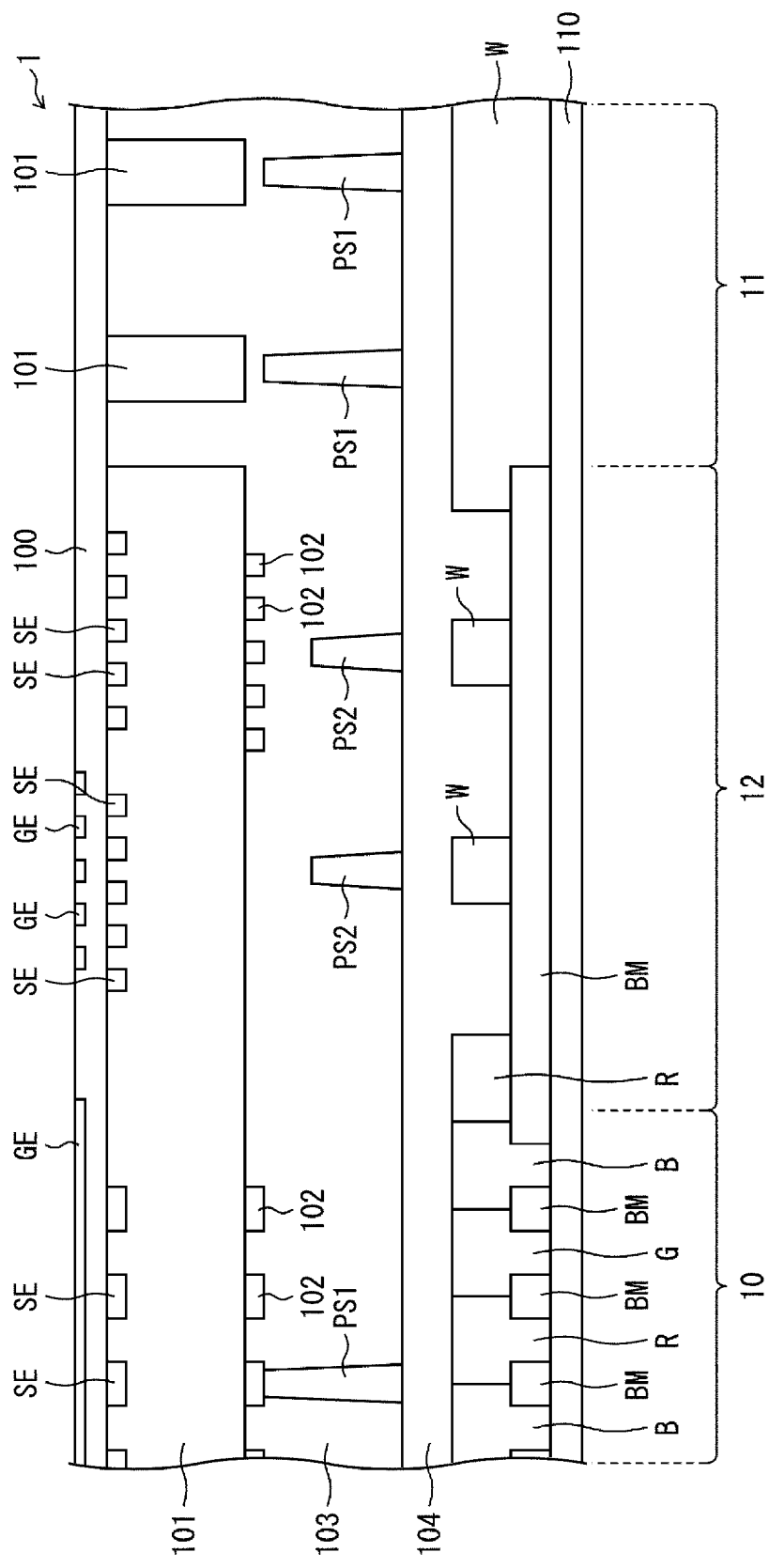
FIG. 4 is a view illustrating a cross-sectional structure taken along the IV-IV cross-section in FIG. 2.

FIG. 1 is a schematic view illustrating a display device 1 according to the first embodiment. FIG. 4 is a view illustrating a cross-sectional structure in a periphery of a hole region 11. As illustrated in FIG. 1, the display device 1 has a rectangular outer shape, for example. As illustrated in FIG. 4, the display device 1 includes an array substrate 100 and a color filter (CF) substrate 110 that face each other at a predetermined interval, a liquid crystal layer 103 encapsulated between the pair of substrates, and a protection layer 104. The display device 1 is a liquid crystal display device of an in-plane switch mode (IPS mode) that is used as a liquid crystal display (LCD) of a smartphone and the like. Note that, in addition to this, the display device 1 is applicable to a display unit of a notebook PC and the like.

A display region 10 of the display device 1 is arranged on a front surface of the color filter substrate 110 (a near side in FIG. 1 in the drawing sheet). The circular hole region 11 is formed in the display region 10. The hole region 11 is an arrangement region of a see through hole (STH) provided in the color filter substrate 110. On a back surface of the hole region 11 of the color filter substrate 110 (a back surface side in FIG. 1 in the drawing sheet), a camera or the like is arranged.

Figure 2:
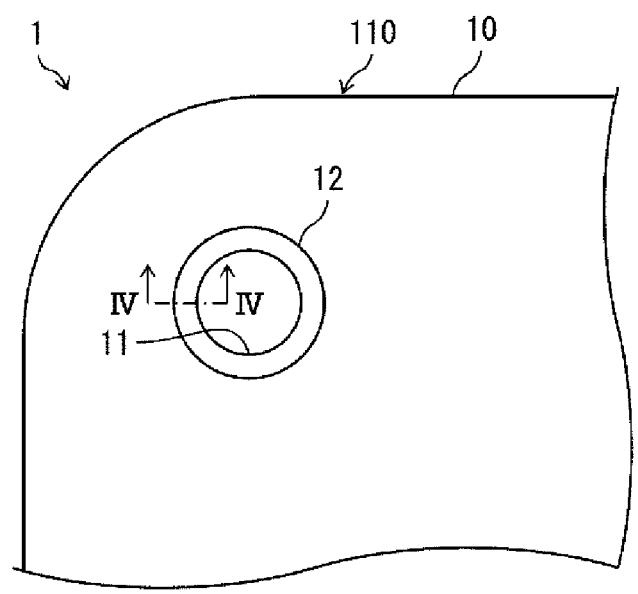
FIG. 2 is an enlarged view of a periphery of a hole region in FIG. 1.

FIG. 2 is an enlarged view of the periphery of the hole region 11. As illustrated in FIG. 2, at an outer periphery of the hole region 11, an annular hole frame region 12 having a light blocking effect is formed. The hole region 11 and the hole frame region 12 are arranged at one of the four corners of the display region 10 (an upper left side in FIG. 1). Note that the hole region 11 and the hole frame region 12 are not limited to have a circular shape, and may be a rectangular shape, for example.

Array Substrate

Figure 3:
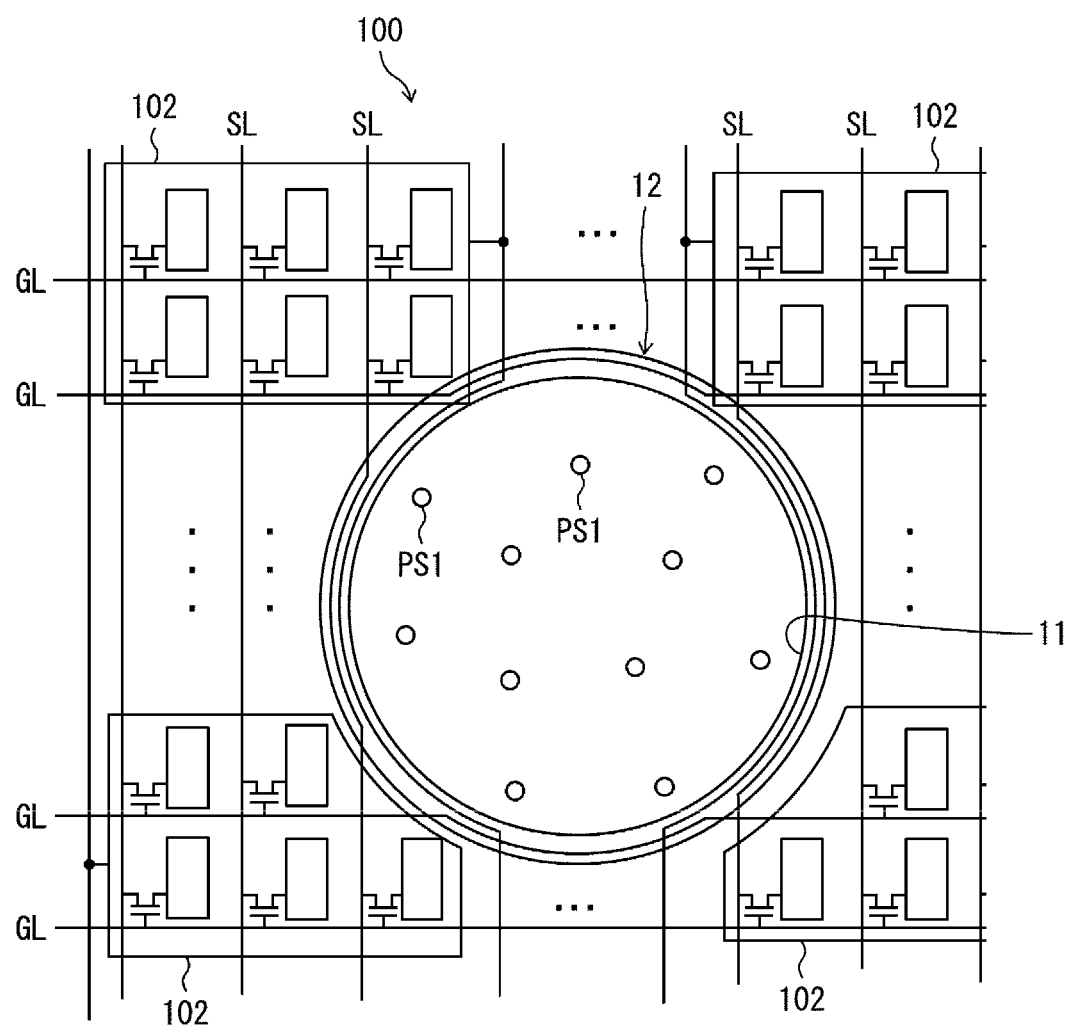
FIG. 3 is a plan view illustrating a wiring line structure in the periphery of the hole region in FIG. 2.

Next, with reference to FIG. 3 and FIG. 4, the array substrate 100 is described. FIG. 3 is a plan view illustrating a wiring line structure in the periphery of the hole region 11 of the display device 1. Note that FIG. 3 is a view of the array substrate 100 as seen from the color filter substrate 110 side.

As illustrated in FIG. 3, the array substrate 100 includes a plurality of signal lines SL in a vertical direction (up-and-down direction in FIG. 3) and a plurality of scanning lines GL (gate line) in a lateral direction (right-and-left direction in FIG. 3). Note that the plurality of signal lines SL and the plurality of scanning lines GL are provided to bypass the hole region 11.

For example, the array substrate 100 has a configuration in which a thin film transistor (TFT) is arranged on a surface of a transparent glass substrate on the color filter substrate 110 side. An amorphous and light-transmissive glass substrate is preferably used.

As illustrated in FIG. 4, a plurality of source electrodes SE and a plurality of gate electrodes GE are provided to the array substrate 100. Note that, in addition to this, although omitted in illustration, a gate insulating film, a drain electrode, and the like are provided to the array substrate 100.

An organic flattening film 101 (JAS) is formed on a surface of the array substrate 100 on the color filter substrate 110 side, and thus the source electrodes SE and the like are covered. As the material of the organic flattening film 101, for example, an acrylic resin, a polyimide resin, or benzocyclobutene (BCB) may be used. For example, the organic flattening film 101 has a thickness falling within a range approximately from 2.0 μm to 3.0 μm. Note that the thickness of the organic flattening film 101 may be changed as appropriate.

A plurality of pixel electrodes 102 are formed on a surface of the organic flattening film 101 on the color filter substrate 110 side (see FIG. 3). For example, the pixel electrode 102 is formed of an indium tin oxide (ITO) electrode. For example, the pixel electrode 102 has a thickness of approximately 0.05 μm. The material of the pixel electrode 102 is not limited to ITO, and other transparent conductive materials may be used. The thickness of the pixel electrode 102 may be changed as appropriate.

Note that, although not illustrated, a protection insulating film is formed on the pixel electrode 102 on the color filter substrate 110 side, and thus the pixel electrode 102 are covered. For example, as the material of the protection insulating film, SiNx may be used. For example, the protection insulating film has a thickness falling in a range from 0.1 μm to 0.5 μm.

Color Filter Substrate

Next, with reference to FIG. 4, the color filter substrate 110 is described. For example, the color filter substrate 110 is formed of an amorphous and light-transmissive glass substrate. A plurality of color filters B, R, G, and W, a black matrix BM, and the like are formed on a surface of the color filter substrate 110 on the array substrate 100 side. The color filter substrate 110 includes the display region 10, the hole region 11, and the hole frame region 12.

The color filters B, R, G, and W are filters that allow light having different colors to pass therethrough. Specifically, the color filter B transmits blue light. The color filter R transmits red light. The color filter G transmits green light. The color filter W transmits white light. Only the color filter W is provided in the hole region 11 of the color filter substrate 110. With this, light transmittance is secured in the hole region 11.

The black matrix BM is a light shielding film that shields gaps between the color filter B, the color filter R, and the color filter G from light.

Note that, although not illustrated, an alignment film, a counter electrode, and the like are formed on the surface of the color filter substrate 110 on the array substrate 100 side. For example, the alignment film is a member that is formed of polyimide and aligns molecules of the liquid crystal layer 103 in a certain direction.

Spacer

Figure 5:
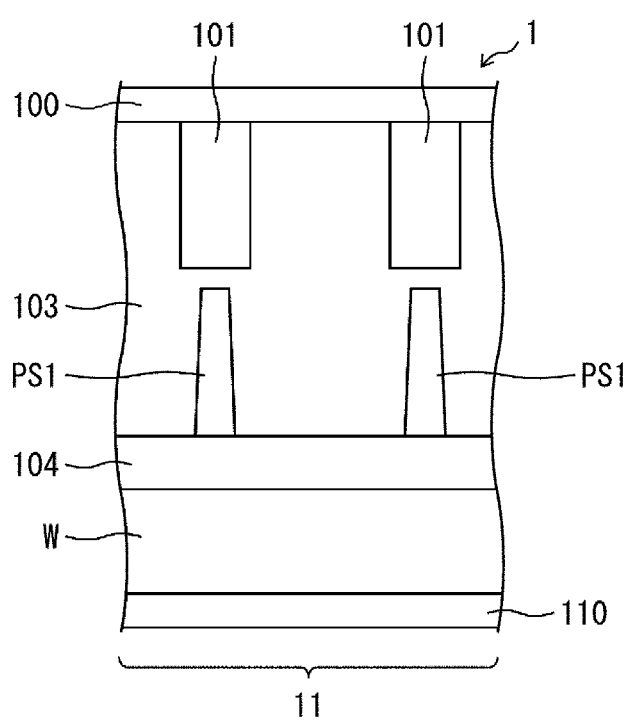
FIG. 5 is an enlarged view of the periphery of the hole region in FIG. 4.

Next, with reference to FIG. 3 to FIG. 5, main spacers PS1 and sub spacers PS2 are described. As illustrated in FIG. 4, the plurality of main spacers PS1 and the plurality of sub spacers PS2 are provided between the organic flattening film 101 formed on the array substrate 100 and the protection layer 104 described later. Each of the main spacer PS1 and the sub spacer PS2 is a member that uniformly maintains the distance (cell thickness) between the array substrate 100 and the color filter substrate 110, and a photosensitive photo spacer is used, for example.

The main spacer PS1 and the sub spacer PS2 have a columnar shape. A bottom surface shape of each of the main spacer PS1 and the sub spacer PS2 is circular, rectangular, or the like. The main spacer PS1 is formed to have a height higher than a height of the sub spacer PS2. Note that the main spacer PS1 and the sub spacer PS2 may have substantially the same height. The shape of each of the main spacer PS1 and the sub spacer PS2 may be changed as appropriate.

As illustrated in FIG. 3, the main spacers PS1 are arranged at a predetermined interval in the hole region 11 in a plane view. As illustrated in FIG. 4, such main spacer PS1 abuts against the pixel electrode 102 formed on the organic flattening film 101 and the protection layer 104 described later. Meanwhile, the sub spacers PS2 are not arranged in the hole region 11.

Note that the arrangement positions of the main spacers PS1 and the sub spacers PS2 may be changed as appropriate. For example, it is preferred that the main spacers PS1 and the sub spacers PS2 be arranged at positions at which pressurization strength of the display device 1 can be increased and air bubbles can be prevented from being generated in the liquid crystal layer 103.

Protection Layer

The protection layer 104 (OC layer) that protects the color filters B, R, G, and W is arranged between the color filter substrate 110 and the liquid crystal layer 103. As the material of the protection layer 104, a thermosetting resin, a photo-curable resin, or the like may be used. Note that, as the thermosetting resin, an epoxy resin and the like are exemplified. As the photo-curable resin, an acrylate resin, a methacrylate resin, and the like are exemplified.

Internal Structure of Hole Region

Next, with reference to FIG. 4 and FIG. 5, an internal structure of the hole region 11 of the display device 1 according to the first embodiment is described. In the first embodiment, in the thickness direction of the hole region 11 of the color filter substrate 110, at parts corresponding to positions without the main spacers PS1, the organic flattening film 101 is not formed. Meanwhile, at parts corresponding to the positions of the main spacers PS1, the organic flattening film 101 is formed. Note that, in the hole region 11, a see-through hole (STH) is formed in the array substrate 100, and the TFT, the source electrode SE, the gate electrode GE, and the like are not formed on the glass substrate.

As described above, the organic flattening film 101 is formed only at the parts corresponding to the positions of the main spacers PS1, and the organic flattening film 101 at the other parts corresponding to the positions without the main spacers PS1 is removed. With this, transmittance in the hole region 11 can be improved. Note that, as a method of removing the organic flattening film 101, for example, etching is performed.

In the hole region 11, the arrangement density of the main spacers PS1I is set to substantially the same as the arrangement density of the main spacers PS1 that are arranged in the display region 10 and the hole frame region 12. Here, the arrangement density indicates the number of main spacers PS1 arranged per a predetermined area, and specifically, the arrangement density is set to approximately five to twenty per square centimeter, for example.

As described above, the arrangement density of the main spacers PS1 is uniformed in the entirety of the display region 10, the hole region 11, and the hole frame region 12, and thus the cell thickness and the pressurization strength can be secured stably.

As described above, with the display device 1 according to the first embodiment, transmittance in the hole region 11 can be improved while stabilizing the thickness (cell thickness) between the array substrate 100 and the color filter substrate 110 in the hole region 11.

The color filter W that allows white light to pass therethrough is provided in the hole region 11 of the color filter substrate 110, and hence reduction in transmittance of the hole region 11 can be suppressed.

Second Embodiment

Figure 6:
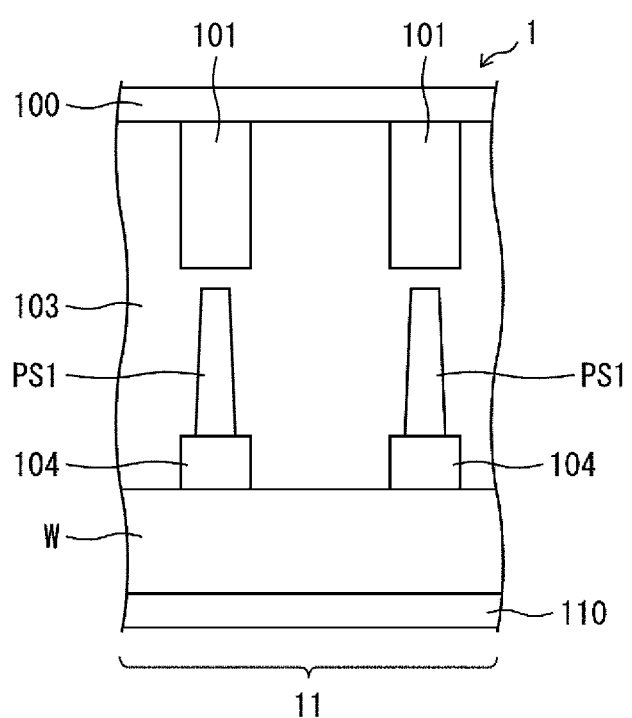
FIG. 6 is a view illustrating a cross-sectional structure in a periphery of a hole region of a display device according to a second embodiment of the present invention.

With reference to FIG. 6, a display device 1 according to a second embodiment of the present invention is described. Note that, for convenience of description, members having the same function as the members described in the first embodiment are denoted with the same reference symbols, and description therefor is not repeated.

Internal Structure of Hole Region

As illustrated in FIG. 6, the display device 1 according to the second embodiment is different from the first embodiment described above in that the protection layer 104 is not formed at the parts corresponding to the positions without the main spacers PS1 in the thickness direction of the hole region 11 of the color filter substrate 110.

In other words, in the thickness direction of the hole region 11 of the color filter substrate 110, the protection layer 104 is formed only at the parts corresponding to the positions of the main spacers PS1. As described above, the protection layer 104 is removed at the parts corresponding to the positions without the main spacers PS1. With this, transmittance in the hole region 11 can be improved as compared to the first embodiment.

Note that, similarly to the first embodiment, in the second embodiment, the organic flattening film 101 is formed at the parts corresponding to the positions of the main spacers PS1 in the thickness direction of the hole region 11 of the color filter substrate 110. In the hole region 11 of the color filter substrate 110, the plurality of main spacers PS1 are arranged at the arrangement density substantially the same as that in the display region 10 and the hole frame region 12.

In the hole region 11, a circular see-through hole is formed in the array substrate 100, and the TFT, the source electrode SE, the gate electrode GE, and the like are not formed on the glass substrate.

Also with the display device 1 according to the second embodiment described above, similarly to the display device 1 according to the first embodiment, both the stabilization of the thickness between the array substrate 100 and the color filter substrate 110 in the hole region 11 and improvement of transmittance in the hole region 11 can be achieved. In particular, at the parts corresponding to the positions without the main spacers PS1, the organic flattening film 101 and the protection layer 104 are not formed, and thus, transmittance in the hole region 11 can be improved as compared to the first embodiment.

The color filter W that allows white light to pass therethrough is provided in the hole region 11 of the color filter substrate 110, and hence reduction in transmittance of the hole region 11 can be suppressed.

Third Embodiment

Figure 7:
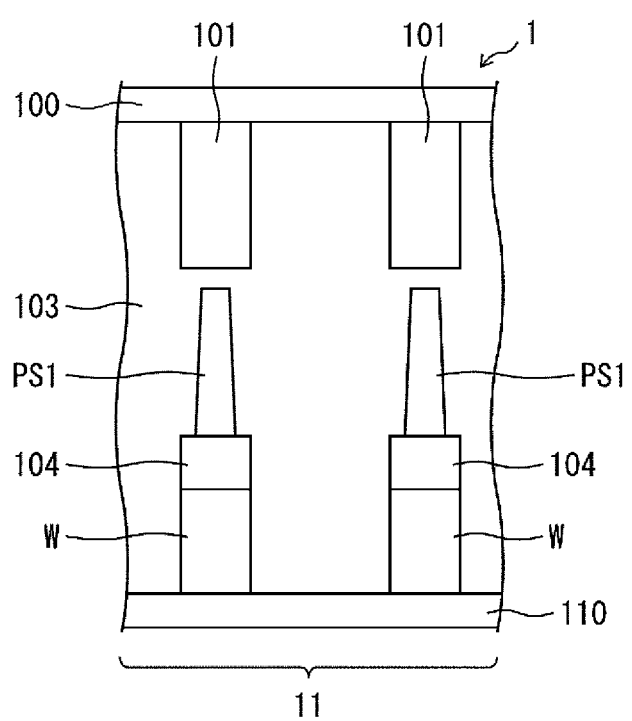
FIG. 7 is a view illustrating a cross-sectional structure in a periphery of a hole region of a display device according to a third embodiment of the present invention.

With reference to FIG. 7, a display device 1 according to a third embodiment of the present invention is described. Note that, for convenience of description, members having the same function as the members described in the first embodiment are denoted with the same reference symbols, and description therefor is not repeated.

Internal Structure of Hole Region

As illustrated in FIG. 7, the display device 1 according to the third embodiment is different from the first embodiment described above in that the protection layer 104 and the color filter W are not formed at the parts corresponding to the positions without the main spacers PS1 in the thickness direction of the hole region 11 of the color filter substrate 110.

In other words, the protection layer 104 and the color filter W are formed only at the parts corresponding to the positions of the main spacers PS1 in the thickness direction of the hole region 11 of the color filter substrate 110. As described above, at the parts corresponding to the positions without the main spacers PS1, the protection layer 104 and the color filter W are removed, and hence transmittance in the hole region 11 can further be improved as compared to the first embodiment.

Note that, similarly to the first embodiment, in the third embodiment, the organic flattening film 101 is formed at the parts corresponding to the positions of the main spacer PS1 in the thickness direction of the hole region 11 of the color filter substrate 110. In the hole region 11 of the color filter substrate 110, the plurality of main spacers PS1I are arranged at the arrangement density substantially the same as that in the display region 10 and the hole frame region 12.

In the hole region 11 of the array substrate 100, a circular see-through hole is formed, and the TFT, the source electrode SE, the gate electrode GE, and the like are not formed on the glass substrate.

Also with the display device 1 according to the third embodiment described above, similarly to the display device according to the first embodiment, both the stabilization of the thickness between the array substrate 100 and the color filter substrate 110 in the hole region 11 and improvement of transmittance in the hole region 11 can be achieved. In particular, at the parts corresponding to the positions without the main spacers PS1 the organic flattening film 101, the protection layer 104 and the color filter W are not formed, and thus, transmittance in the hole region 11 can further be improved.

The color filter W that allows white light to pass therethrough is provided in the hole region 11 of the color filter substrate 110, and hence reduction in transmittance of the hole region 11 can be suppressed.

OTHER EMBODIMENTS

In the embodiments described above, the main spacers PS1 are arranged in the hole region 11. In place of the main spacers PS1, the sub spacers PS2 may be arranged. In the display region 10 and the hole frame region 12, the main spacers PS1 and the sub spacers PS2 are arranged. However, for example, the sub spacers PS2 may not be provided.

In the embodiments described above, a circular see-through hole (STH) is formed in the hole region 11 of the array substrate 100, and a through hole that passes through the glass substrate is not provided. However, the present disclosure is not limited to this configuration. For example, a circular through hole may be provided in the glass substrate forming the array substrate 100.

The present invention is not limited to each of the embodiments described above, and various modifications may be made within the scope of the claims. Embodiments obtained by appropriately combining technical approaches disclosed in each of the different embodiments also fall within the technical scope of the present invention. Moreover, novel technical features can be formed by combining the technical approaches disclosed in the embodiments.

The invention claimed is:

1. A display device comprising:
a color filter substrate including a display region, a hole frame region, and a hole region and including a plurality of color filters;
an array substrate facing the color filter substrate and including an organic flattening film formed on a surface on a side close to the color filter substrate;
a liquid crystal layer sandwiched between the color filter substrate and the array substrate;
a protection layer configured to protect the plurality of color filters, the protection layer being arranged between the color filter substrate and the liquid crystal layer; and
a plurality of spacers arranged between the protection layer and the array substrate,
wherein the organic flattening film is present at parts corresponding to the positions of the plurality of spacers in a thickness direction of the hole region of the color filter substrate.

2. The display device according to claim 1,
wherein the protection layer is present at the parts corresponding to the positions of the plurality of spacers in the thickness direction of the hole region of the color filter substrate.

3. The display device according to claim 2,
wherein the plurality of color filters are present at the parts corresponding to the positions of the plurality of spacers in the thickness direction of the hole region of the color filter substrate.

4. The display device according to claim 3,
wherein one of the plurality of color filters that transmits white light is provided in the hole region of the color filter substrate.

5. The display device according to claim 1,
wherein, in the hole region of the color filter substrate, the plurality of spacers are arranged at a density substantially the same a density in the display region and the hole frame region.

* * * * *